(12) United States Patent
Abate et al.

(10) Patent No.: US 11,677,615 B2
(45) Date of Patent: Jun. 13, 2023

(54) SYSTEMS AND METHODS FOR INCORPORATING AUTOMATED REMEDIATION INTO INFORMATION TECHNOLOGY INCIDENT SOLUTIONS

(71) Applicant: Fortinet, Inc., Sunnyvale, CA (US)

(72) Inventors: Jason Abate, Chicago, IL (US); Shabbir Karimi, Chicago, IL (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/238,316

(22) Filed: Apr. 23, 2021

(65) Prior Publication Data
US 2022/0368587 A1 Nov. 17, 2022

(51) Int. Cl.
*H04L 41/0654* (2022.01)
*H04L 41/00* (2022.01)
*H04L 41/069* (2022.01)

(52) U.S. Cl.
CPC ........ *H04L 41/0654* (2013.01); *H04L 41/069* (2013.01); *H04L 41/30* (2013.01)

(58) Field of Classification Search
CPC ............ G06F 11/0709; G06F 11/0766; G06F 11/0787; G06F 11/0793; G06F 11/07; G06F 11/0703; G06F 11/079; H04L 41/06; H04L 41/0654; H04L 41/0681; H04L 41/0686; H04L 41/069; H04L 41/30; H04L 41/16
See application file for complete search history.

(56) References Cited

U.S. PATENT DOCUMENTS

| | | | | |
|---|---|---|---|---|
| 9,069,737 | B1 * | 6/2015 | Kimotho | G06F 11/0793 |
| 9,354,997 | B2 * | 5/2016 | Marr | G06F 11/0706 |
| 10,896,073 | B1 * | 1/2021 | Jain | G06F 11/0793 |
| 10,970,150 | B1 * | 4/2021 | Hunter | G06F 11/0769 |
| 11,188,405 | B1 * | 11/2021 | Garty | G06F 11/0793 |
| 11,210,160 | B1 * | 12/2021 | Dukhovny | G06F 11/0793 |
| 11,444,826 | B1 * | 9/2022 | Abate | H04L 41/0654 |
| 2004/0054770 | A1 * | 3/2004 | Touboul | H04L 41/069 709/223 |
| 2008/0162688 | A1 * | 7/2008 | Reumann | G06F 11/0793 709/224 |
| 2008/0168018 | A1 * | 7/2008 | Rohlfing | H04L 41/16 706/47 |
| 2008/0181100 | A1 * | 7/2008 | Yang | H04L 41/0654 370/216 |
| 2008/0192639 | A1 * | 8/2008 | Narayanan | H04L 41/5019 370/245 |
| 2011/0185233 | A1 * | 7/2011 | Belluomini | G06F 11/079 714/E11.029 |

(Continued)

OTHER PUBLICATIONS

Kang, Yong-Bin, et al. "A computer-facilitated method for matching incident cases using semantic similarity measurement." 2009 IFIP/IEEE International Symposium on Integrated Network Management—Workshops. IEEE, 2009. (Year: 2009).*

*Primary Examiner* — Vivek Srivastava
*Assistant Examiner* — William C McBeth
(74) *Attorney, Agent, or Firm* — HDC Intellectual Property Law, LLP

(57) ABSTRACT

Various approaches for providing network maintenance and health monitoring. In some cases, some approaches include systems, methods, and/or devices that provide for receiving and cataloging network incidents and invoking automated remediation in relation to network incidents.

28 Claims, 7 Drawing Sheets

(56) References Cited

U.S. PATENT DOCUMENTS

| | | | |
|---|---|---|---|
| 2013/0007527 A1* | 1/2013 | Petukhov | G06F 11/0793 |
| | | | 714/37 |
| 2014/0310222 A1* | 10/2014 | Davlos | G06F 11/079 |
| | | | 706/46 |
| 2015/0271008 A1* | 9/2015 | Jain | H04L 41/0654 |
| | | | 714/57 |
| 2017/0083390 A1* | 3/2017 | Talwadker | G06F 11/079 |
| 2017/0139762 A1* | 5/2017 | Sherlock | G06F 11/0709 |
| 2019/0129780 A1* | 5/2019 | DelSordo | G06F 11/0793 |
| 2019/0163594 A1* | 5/2019 | Hayden | G06F 11/0793 |
| 2019/0306016 A1* | 10/2019 | Flynn | G06F 11/0793 |
| 2019/0332463 A1* | 10/2019 | Srinivasan | G06F 11/0793 |
| 2019/0334764 A1* | 10/2019 | Chor | H04L 41/0654 |
| 2020/0057953 A1* | 2/2020 | Livny | H04L 41/0654 |
| 2020/0204434 A1* | 6/2020 | Nitsch | H04L 41/0654 |
| 2021/0111966 A1* | 4/2021 | Qaadri | H04L 41/0654 |

* cited by examiner

SYSTEMS AND METHODS FOR INCORPORATING AUTOMATED REMEDIATION INTO INFORMATION TECHNOLOGY INCIDENT SOLUTIONS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2021, Fortinet, Inc.

FIELD

Embodiments discussed generally relate to network maintenance and health monitoring. In some cases, embodiments discussed relate to systems and methods for receiving and cataloging network incidents and invoking automated remediation in relation to network incidents.

BACKGROUND

It is not uncommon for large operations teams, especially in a distributed environment, to oversee network and network related functionality. The size of the organizations makes it challenging to coordinate knowledge around solutions to common incidents that arise with regularity. In their environments, the same problems often encounter repeatedly, with different team members having to identify, triage, troubleshoot and resolve the same problem over and over prior to a permanent solution being put in place. This applies even more to managed service providers, who are running similar but slightly different environments for each of their customers.

Thus, there exists a need in the art for more advanced approaches, devices and systems for monitoring and addressing network functionality.

SUMMARY

Various embodiments provide systems and methods for network maintenance and monitoring. In some cases, embodiments discussed relate to systems and methods for receiving and cataloging network incidents and invoking automated remediation in relation to network incidents.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
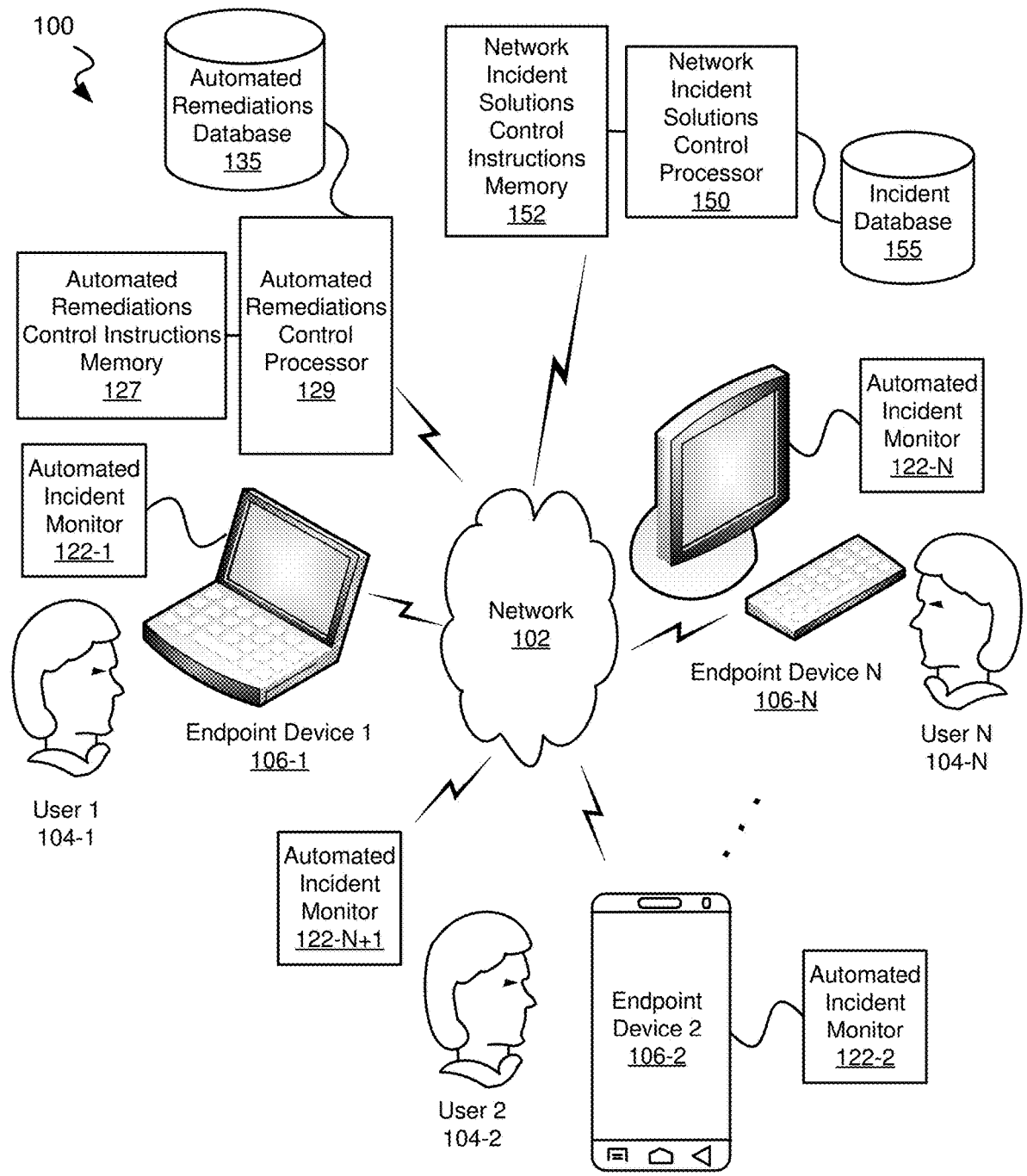
FIGS. 1A-B illustrate a network architecture in accordance with some embodiments.

Various embodiments provide systems and methods for network maintenance and monitoring. In some cases, embodiments discussed relate to systems and methods for receiving and cataloging network incidents and invoking automated remediation in relation to network incidents.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network element malfunction" is used in its broadest sense to mean any malfunction within a network environment including, but not limited to: a failure of a network server; a failure of a cloud based service; a failure of an endpoint device; a failure of a software application executing on a device in the network such as, for example, a network server or an endpoint device; and/or a failure of a downstream provider. Based upon the disclosure provided herein, one of ordinary skill in the art will recognize a myriad of malfunctions that may be considered a network element malfunction The phrase "automated remediation" is used in its broadest sense to mean one or more actions that are automatically employed as part of diagnosing and/or mitigating a network condition based upon the occurrence of a condition set. For example, where it is detected that the CPU usage of a network device has exceeded a defined threshold for a defined period (i.e., the condition set), the automated remediation may be to assign an incident lead and log the incident lead into the particular network device. Such an automated remediation that automatically connects an incident lead and provides status may be referred to herein as a "diagnostic automated remediation". As another example, where it is detected that the memory usage of a network device has exceeded a defined threshold for a defined period (i.e., the condition set), the automated remediation may be to automatically restart the network device and send a message to an incident lead identifying the conditions surrounding the incident. As yet another example, where it is detected that the CPU usage of a network device has exceeded a defined threshold for a defined period (i.e., the condition set), the automated remediation may be to automatically stop a process executing on the network device that is using significant CPU bandwidth. Such automated remediations that automatically modify the operation of one or more network devices may be referred to herein as an "active automated remediation". Such automated remediations may be pre-programmed solutions that a user selects to automatically execute whenever one or more metrics (i.e., a condition set) match a pre-programmed threshold. Based upon the disclosure provided herein, one of ordinary skill in the art will recognize a variety of automated remediations, both diagnostic and active, that may be employed in relation to different embodiments. Further, based upon the disclosure provided herein, one of ordinary skill in the art will recognize a variety of condition sets that may be used to trigger automated remediations in relation to different embodiments.

The phrase "processing resource" is used in its broadest sense to mean one or more processors capable of executing instructions.

Example embodiments will now be described more fully hereinafter with reference to the accompanying drawings, in which exemplary embodiments are shown. This disclosure may, however, be embodied in many different forms and should not be construed as limited to the embodiments set forth herein.

Thus, for example, it will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for distributing network intelligence. Such methods include: receiving an indication of a network element malfunction, where the indication of the network element malfunction includes at least a first data; identifying an automated remediation corresponding to the first data from an automated remediation database; applying the automated remediation; and linking the automated remediation as a possible solution for an incident in an incident database. The incident database is separate from the automated remediation database.

In some instances of the aforementioned embodiments, the methods further include creating the incident in the incident database. The created incident includes at least the first data and is done based upon a determination that the network element malfunction was changed by application of the automated remediation. In some cases, the change in the network element malfunction is a cure or mitigation of the network element malfunction. In various instances of the aforementioned embodiments, the methods further include adding a positive vote for the possible solution based at least in part upon a determination that the network element malfunction was cured by application of the automated remediation. In some instances of the aforementioned embodiments, the automated remediation is pre-programmed by a first user to be applied when at least the first data is detected, and the indication of the network element malfunction is received from a second user.

In various instances of the aforementioned embodiments, the methods further include: providing the automated remediation as one of a number of possible solutions to the network element malfunction; and receiving a solution selection indicating the automated remediation. In such instances, applying the automated remediation is done based at least in part on the solution selection. In some instances of the aforementioned embodiments, the incident database includes at least one non-automated solution linked to the incident.

Other embodiments provide methods for distributing network intelligence that include: receiving an indication of a network element malfunction that includes at least a first data; identifying an automated remediation corresponding to the first data; applying the automated remediation; and linking the automated remediation as a possible solution for an incident in an incident database based at least in part upon a determination that the network element malfunction was changed by application of the automated remediation. In some cases, the determination that the network element malfunction was changed by application of the automated remediation is a determination that the network element malfunction was cured by application of the automated remediation.

In some instances of the aforementioned embodiments, the methods further include adding a positive vote for the possible solution based at least in part upon the determination that the network element malfunction was changed by application of the automated remediation. In various instances of the aforementioned embodiments, the automated remediation is pre-programmed by a first user to be applied when at least the first data is detected, the automated remediation is maintained in an automated remediation database that is separate from the incident database, and the indication of the network element malfunction is received from a second user.

In various instances of the aforementioned embodiments, the methods further include: providing the automated remediation as one of a number of possible solutions to the network element malfunction; and receiving a solution selection indicating the automated remediation. In such instances, applying the automated remediation is done based at least in part on the solution selection. In some instances of the aforementioned embodiments, the methods further include creating the incident in the incident database that includes at least the first data. In some instances of the aforementioned embodiments, the incident database includes at least one non-automated solution linked to the incident.

Yet other embodiments provide network incident systems that include a processing resource, an incident database, and a memory. The incident database includes: at least a first incident corresponding to a prior network element malfunction, at least a first possible solution linked to the first incident, and at least a first incident tag linked to the first incident. The first incident tag includes at least a first element describing an aspect of the prior network element malfunction. The memory includes instructions executable by the processing resource to: receive an indication of a current network element malfunction that includes at least a first data describing an aspect of the current network element malfunction; identify an automated remediation corresponding to the first data; apply the automated remediation; and link the automated remediation as a solution to an incident in the incident database based at least in part upon a determination that the network element malfunction was changed by application of the automated remediation.

In some instances of the aforementioned embodiments, the incident in the incident database to which the solution is linked is the first incident in the incident database, and the solution is a second possible solution linked to the first incident. In various instances of the aforementioned embodiments, the first possible solution is linked to the first incident in the incident database is a non-automated solution. In various instances, the memory includes further instructions executable by the processing resource to add a positive vote for the solution based at least in part upon the determination that the network element malfunction was changed by application of the automated remediation. In one or more instances of the aforementioned embodiments, the automated remediation is pre-programmed by a first user to be applied when at least the first data is detected, the automated remediation is maintained in an automated remediation database that is separate from the incident database, and the indication of the network element malfunction is received from a second user.

In various instances of the aforementioned embodiments, the memory includes further instructions executable by the processing resource to: provide the automated remediation as one of a number of possible solutions to the network element malfunction; and receive a solution selection indicating the automated remediation. In such instances, applying the automated remediation only apply the automated remediation upon receiving the solution selection. In some instances of the aforementioned embodiments, the memory includes further instructions executable by the processing resource to create a second incident in the incident database. The second incident is linked to the solution and a second incident tag, and the second incident tag includes at least the first data as a second element describing an aspect of the current network element malfunction.

Yet further embodiments provide non-transitory computer-readable storage media that embody a set of instructions, which when executed by a processing resource, causes the processing resource to perform a method comprising: receiving an indication of a network element malfunction, wherein the indication of the network element malfunction includes at least a first data; identifying an automated remediation corresponding to the first data; applying the automated remediation; and linking the automated remediation as a possible solution for an incident in an incident database based at least in part upon a determination that the network element malfunction was changed by application of the automated remediation.

Turning to FIG. 1A, network architecture 100 is shown in accordance with some embodiments. In the context of network architecture 100, a network incident solutions control processor 150 is communicably coupled to endpoint devices 106-1, 106-2, . . . , 106-N via a network 102. Further, an automated remediations control processor 129 is communicably coupled to incident solutions control processor 150 and to endpoint devices 106-1, 106-2, . . . , 106-N via network 102. Network incident solutions control processor 150 may provide a cloud-based service sourcing a variety of services via network 102. Similarly, automated remediations control processor 129 may provide a cloud-based service sourcing a variety of services via network 102. In some cases, such cloud-based services may be implemented within a public cloud, a private cloud, or a hybrid cloud. Based upon the disclosure provided herein, one of ordinary skill in the art will recognize a variety of network architectures in which network incident solutions control processor 150 and/or automated remediations control processor 129 may be deployed.

Network incident solutions control processor 150 may include one or more processors and/or circuitry implementing processing functions provided by network incident solutions control processor 150. Network incident solutions control processor 150 is coupled to a memory 152 that includes instructions executable by network incident solutions control processor 150 to perform one or more of the processing functions provided by network incident solutions control processor 150. In addition, network incident solutions control processor 150 is coupled to an incident database 155 that includes incident data. The incident data is a catalog of information about network element malfunctions including solutions for the cataloged network element malfunctions.

Automated remediations control processor 129 may include one or more processors and/or circuitry implementing processing functions provided by automated remediations control processor 129. Automated remediations control processor 129 is coupled to a memory 127 that includes instructions executable by network incident solutions control processor 150 to perform one or more of the processing functions provided by automated remediations control processor 129. In addition, automated remediations control processor 129 is coupled to an automated remediations database 135 that includes pre-programmed automated remediations.

Endpoint devices 106-1, 106-2 . . . 106-N (which may be collectively referred to as endpoint devices 106, and may be individually referred to as endpoint device 106 herein) associated with network 102 may include, but are not limited to, personal computers, smart devices, web-enabled devices, hand-held devices, laptops, mobile devices, and the like. In some embodiments, network incident solutions control processor 150 may interact with users 104-1, 104-2 . . . 104-N (which may be collectively referred to as users 104, and may be individually referred to as a user 104 herein) through network 102 via their respective endpoint devices 106, for example, when interacting to mitigate a network element malfunction, a user 104 may be asked a variety of questions about the time and circumstance of the malfunction which user 104 enters via their respective endpoint device.

An automated incident monitor 122 (e.g., automated incident monitor 122-1, automated incident monitor 122-2, and automated incident monitor 122-N) is associated with respective ones of endpoint devices 106. In some cases, automated incident monitor 122 is an application operating on a respective endpoint device 106 or on an device forming part of network 102 such as, for example, a server, firewall, or cloud service machine. Automated incident monitor 122 is configured to detect malfunctions with the device on which it is executing, applications executing on the device on which it is executing, and/or with other devices and/or services included in or supported as part of network 102 and with which automated incident monitor 122 has vision. One or more automated incident monitors 122 (e.g., automated incident monitor 122-N+1) may be executed by respective network devices and or cloud services included and/or supported as part of network 102. Such automated incident monitors 122 are configured to detect malfunctions with the device on which it is executing, applications executing on the device on which it is executing, and/or with other devices and/or services included in or supported as part of network 102 and with which automated incident monitor 122 has vision. Based upon the disclosure provided herein, one of ordinary skill in the art will recognize a variety of implementations of automated incident monitor 122 that may be used in relation to different embodiments. In operation, when automated incident monitor 122 detects a network element malfunction, it generates an incident alert that is sent to network incident solutions control processor 150.

Those skilled in the art will appreciate that, network 102 can be a wireless network, a wired network or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

As described in further detail below, network incident solutions control processor 150 can maintain information regarding network element malfunctions catalogued by, inter alia, time, grouping with other similar located device types, endpoint device type, operating system type, user characterization of the malfunction, and/or potential solutions.

Figure 1B:
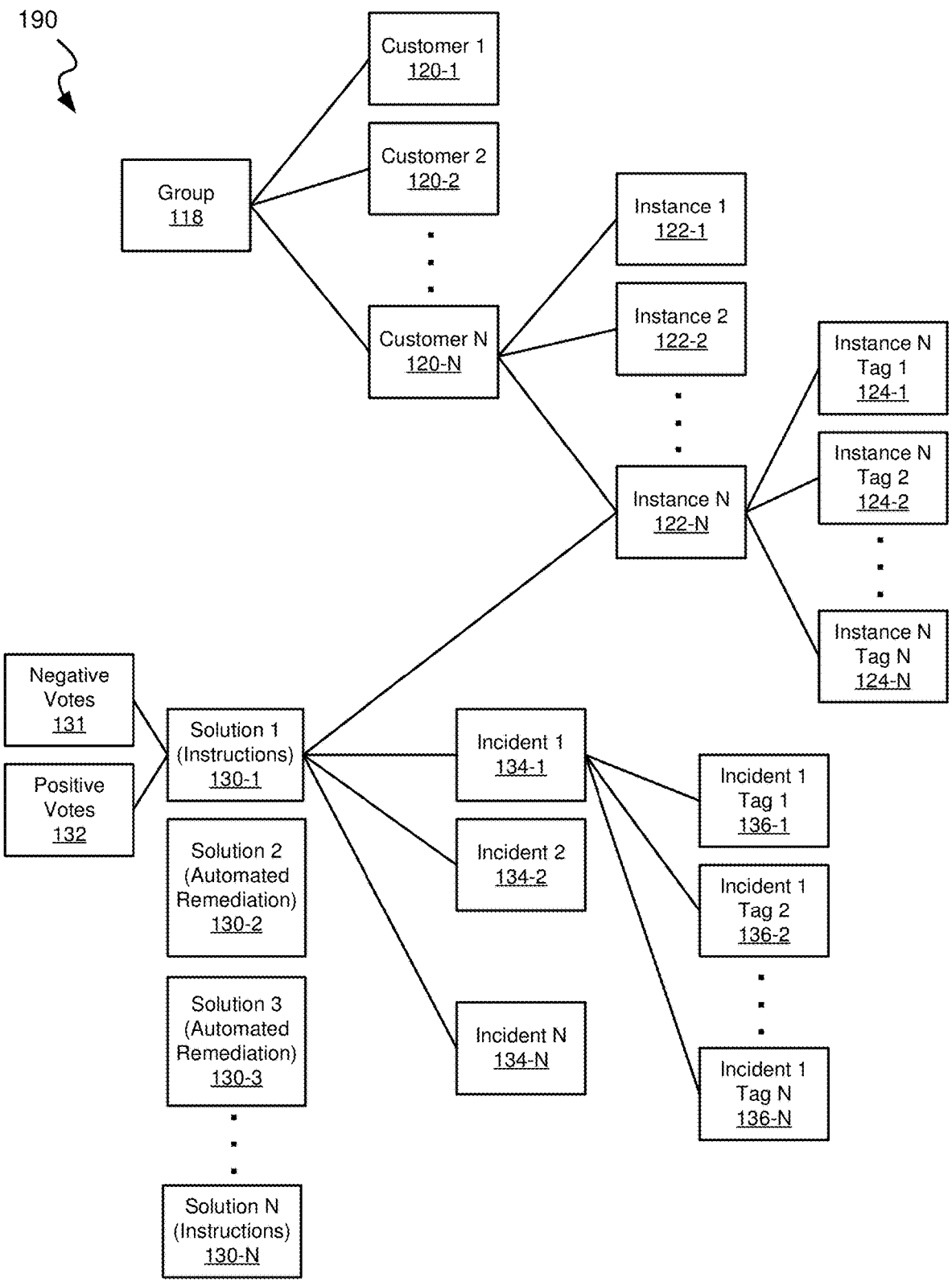

Turning to FIG. 1B, one embodiment 190 of incident database 155 is shown. In this embodiment 190, incident database 155 includes a number of incidents 134 (e.g., incident 1 134-1, incident 2 134-2, . . . , incident N 134-N) of network element malfunctions that have been cataloged. Each incident 134 is associated with zero or more incident tags 136 (e.g., incident tag 1 136-1, incident tag 2 136-2, . . . , incident tag N 136-N). Such incident tags 136 are discrete identification information about the particular incident including, but not limited to, time started, time ended, activity of the user prior to the incident, network transactional information about the incident, and/or user characterization of the incident. Such user characterization of the incident may include, but is not limited to, an indication of user's belief that the problem is a hardware malfunction, software malfunction, and/or downstream provider failure. Based upon the disclosure provided herein, one of ordinary skill in the art will appreciate a variety of other discrete identification information and/or user characterizations that may be included as incident tags 136 in accordance with different embodiments.

In addition, each incident 134 is associated with a solution 130 (e.g., solution 1 130-1, solution 2 130-2, solution 3 130-3, . . . , solution N 130-N) that was previously identified as capable of resolving the network element malfunction corresponding to the particular incident 134. Each solution 130 is associated with a number of negative votes 131 and positive votes 132. Negative votes 131 and positive votes 132 are votes received from users applying the respective solution 130 to a new incident. When the user experiences success in resolving a network element malfunction corresponding to the new incident 134 by applying the solution 130, positive votes 132 are increased by one. Alternatively, when the user experiences failure in resolving a network element malfunction corresponding to the new incident 134 by applying the solution 130, negative votes 131 are increased by one.

Some solutions 130 include instructions for operations that are to be performed in implementing the particular solution (e.g., solution 130-1 and solution 130-N). Other solutions 130 may be automated remediations (e.g., solution 130-2 and solution 130-3). Such solutions include an indication of what the automated remediation will do (e.g., how invasive it is, and possible side effects) and one or more automated processes that when the solution is selected automatically execute.

Each solution 130 is also associated with an instance 122 (e.g., instance 1 122-1, instance 2 122-2, . . . , instance N 122-N) to which the solution 130 was applied. Instances 122 are hardware devices such as end point devices, servers, or other network devices; cloud services, software products, or the like that are associated with a particular customer 120. Based upon the disclosure provided herein, one of ordinary skill in the art will recognize a variety of hardware, software, processes, and/or services that may be identified as instances in accordance with different embodiments.

Each instance 122 includes zero or more instance tags 124 (e.g., instance tag 1 124-1, instance tag 2 124-2, . . . , instance tag N 124-N). Such instance tags 124 are discrete identification information about the particular instance including, but not limited to, environment details, hardware version details, software version details, and/or the like. Based upon the disclosure provided herein, one of ordinary skill in the art will appreciate a variety of other discrete identification information that may be included as instance tags 124 in accordance with different embodiments.

A number of different customers 120 (e.g., customer 1 120-1, customer 2 120-2, . . . , customer N 120-N) may be included in the same organization or group 118. Further, while not shown, there may be further nesting where there are super-groups each formed of one or more groups 118. Based upon the disclosure provided herein, one of ordinary skill in the art will recognize a variety of organizations of groups, customers, and instances that may be used in relation to different embodiments.

In operation, when a user 104 experiences a network element malfunction while using their endpoint device 106, they send an incident alert to network incident solutions control processor 150 via network 102. Alternatively, when an automated incident monitor detects a network element malfunction, it similarly sends an incident alert to network incident solutions control processor 150 via network 102. Such an incident alert may be an electronic request provided by, for example, a web portal in the case of a user or from any type of communication method where an automated incident monitor is reporting the incident alert. Based upon the disclosure provided herein, one of ordinary skill in the art will recognize a variety of mechanisms that may be used by a user and/or automated incident monitor to send an incident alert and by which an incident alert can be received in accordance with different embodiments.

When an incident alert has been received, metadata associated with associated with the device, service, and/or software application associated with the incident that corresponds to the incident alert is received by network incident solutions processor 150. This may be received as part of the incident alert and/or after the incident alert has been received upon solicitation from either user 104 or automated incident monitor 122 that reported the incident alert. In some cases, this metadata includes information about the instance being used by user 104 and/or about the network element malfunction or incident being reported. Such metadata may include, but is not limited to, the group or customer with which user 104 and/or endpoint device 106 is associated, the make and model of endpoint device 106 being used, type and version of application and/or operating system being used by the device associated with the incident alert, downstream provider, and/or network transactional information. Network incident solutions control processor 150 also time stamps the incident with the current time.

Additionally, operational status of the instance associated with the incident alert may be provided and/or accessed. This can include accessing operational status of one or more network devices that may be part of the incident. The operational status may include any information accessible from an endpoint 106 and/or related network devices that indicates how the network device is operating. Such operational status may include, but is not limited to, CPU usage, memory usage, disk usage, network bandwidth usage, non-responsive applications executing on the instance, applications executing on the instance with high CPU usage, applications executing on the instance with high memory usage, and/or applications executing on the instance with high network bandwidth usage. Based upon the disclosure provided herein, one of ordinary skill in the art will recognize a variety of operational status indicators that may be used in relation to different embodiments.

Network incident solutions control processor 150 provides a request to user 104 associated with a device, application, or cloud service that is the subject of the received incident alert via network 102 asking for a general explanation of the network element malfunction. This general explanation is controlled by user 104 who is provided with various selections and/or prompts to help user 104 think of the relevant information. In addition, user 104 is given a free form area to write additional information that user 104 thinks is relevant to the current network element malfunction. The information requested from user 104 may include, but is not limited to, the approximate time of the first indication of the network element malfunction; and steps taken by user 104 to mitigate the network element malfunction; and/or steps taken by user 104 prior to the first indication of the network element malfunction. Based upon the disclosure provided herein, one of ordinary skill in the art will recognize other information that may be requested from user 104.

User 104 is additionally presented with a selection tool by which user 104 is asked to select their belief of what is causing the network element malfunction. User 104 may select, for example, to characterize whether user 104 perceives the network element malfunction they are reporting is caused by, for example, a hardware malfunction, a software malfunction, and/or a downstream provider failure. Further, user 104 may be given a free form where the user 104 can use natural language to describe what they think is cause of the network element malfunction. Based upon the disclosure provided herein, one of ordinary skill in the art will recognize a variety of requests for causation that may be made to user 104 in accordance with different embodiments.

Network incident solutions control processor 150 determines whether user 104 has responded to the various requests that have been made and if the metadata surrounding the incident has been received. Where the information has been received, a new incident 134 is stored to incident database 155 where it is cataloged by network incident solutions control processor 150 by associating it with zero or more incident tags 136. Again, such incident tags 136 are discrete identification information about the particular incident including, but not limited to, time started, time ended, activity of user 104 prior to the incident, network transactional information about the incident, and/or characterization of the incident from user 104. Such user characterization of the incident may include, but is not limited to, an indication of user's belief that the problem is a hardware malfunction, software malfunction, and/or downstream provider failure. All of the aforementioned is parsed from the information received from the user and/or the metadata.

Based upon the disclosure provided herein, one of ordinary skill in the art will appreciate a variety of other discrete identification information and/or user characterizations that may be included as the incident tags in accordance with different embodiments.

The operational status information gathered as part of the incident report is provided to automated remediations control processor 132 that checks to see if any of or a combination of the operational status match one or more available automated remediations. In response, the automated remediations control processor returns one or more automated remediations that match a condition set supported by the operational status.

Network incident solutions control processor 150 scores various prior solutions 130 included in incident database 155 based upon, for example, a weighted proximity to the current incident to yield a weighted score for each previous solution 120 in incident database 155. The scoring is intended to rank previous solutions 120 that would be most likely to solve the current network element malfunction based upon similarities that the prior solutions 120 had to the instance, instance tags, incident, and incident tags between the prior solution and the current network element malfunction. One example of such a scoring process is described in FIG. 3 below. That said, one of ordinary skill in the art will recognize a variety of approaches for scoring similarities between prior solutions and current network element malfunctions that may be used in relation to different embodiments.

User 104 is provided with a combination of the highest scored solutions and any automated remediations provided from automated remediations control processor 130. In some embodiments, only active automated remediations are included with the solutions. User 104 is given an opportunity to try one or more of the proposed solutions to see if they work. As user 104 attempts one or more of the proposed solutions 120, user 104 ranks the each offered solution 120 by whether the solution 120 worked or not and/or provides a new solution that user 104 conceived if none of the proposed solutions 120 worked. Where the first of the proposed solutions 120 worked user 104 will only vote on that solution 120. Where, on the other hand, user 104 attempts multiple solutions 120 in sequence they will likely only vote success on one of the solutions 120 and failure on the others. Network incident solutions control processor 150 determines whether user 104 has provided the feedback on the success or failure of the solutions 120 provided.

Once the votes of success or failure and/or new solution 120 are received from user 104 by network incident solutions control processor 150, these votes are added to prior votes for the corresponding solutions 120 (i.e. negative votes 131 or positive votes 132 are incremented for a given solution) such that the solutions 120 maintained in incident database 155 include feedback from one or more users 104 about the value of the given solutions 120. Thus, for example, where user 104 attempted three proposed solutions 120 and one worked, one success vote and two failure votes are received each for a corresponding solution.

Network incident solutions control processor 150 determines whether one of the proposed solutions 120 worked. Where one of the proposed solutions 120 worked, the solution 120 that worked is linked with the newly created incident and the instance where the problem was detected in incident database 155. Alternatively, where no pre-existing solution 120 worked, but user 104 identified their own solution that worked, that new solution is reported by user 104 and entered in incident database 155 and linked to the newly created incident and corresponding instance. This new solution is then considered with the next network element malfunction is reported by another user 104.

Figure 2:
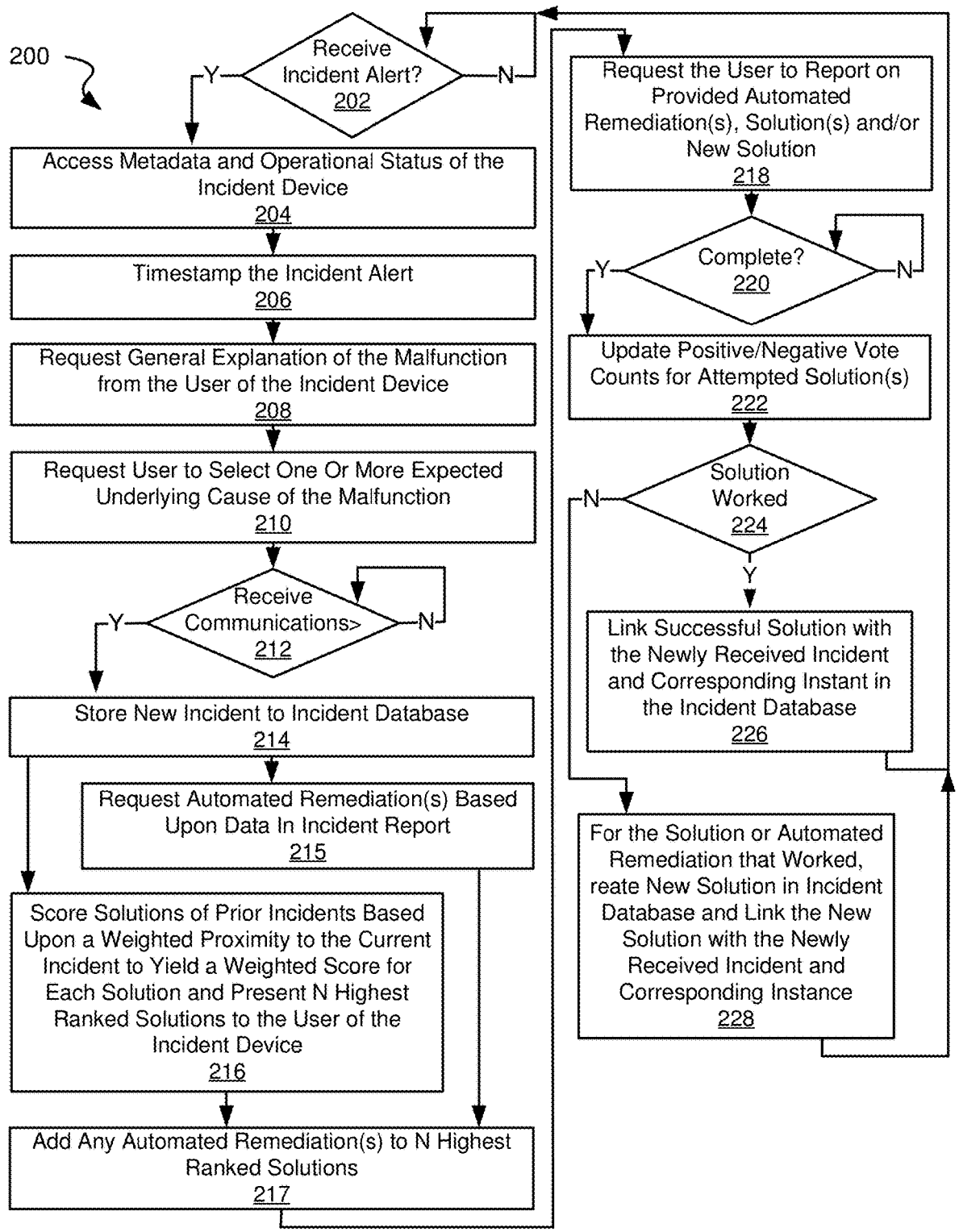
FIG. 2 is a flow diagram showing a method in accordance with various embodiments for cataloging network element malfunctions and incorporating automated remediation into information technology incident solutions.

Turning to FIG. 2, a flow diagram 200 shows a method in accordance with various embodiments flow diagram showing a method in accordance with various embodiments for cataloging network element malfunctions and incorporating automated remediation into information technology incident solutions. Following flow diagram 200, it is determined whether an incident alert has been received from either an automated incident monitor or a user (block 202). An incident alert may be an electronic request received, for example, via a web portal where a user is reporting or from any type of communication method where an automated incident monitor is reporting. Based upon the disclosure provided herein, one of ordinary skill in the art will recognize a variety of mechanisms that may be used by a user or an automated incident monitor to indicate an incident alert and by which an incident alert can be received in accordance with different embodiments.

When an incident alert has been received (block 202), metadata and/or operational status associated with the device, service, and/or software application associated with the incident that corresponds to the incident alert is accessed (block 204). The metadata may be received as part of the incident alert and/or after the incident alert has been received upon solicitation from either the user or automated incident monitor that reported the incident alert. In some cases, this metadata includes information about the instance associated with the incident alert and/or about the network element malfunction or incident being reported. Such metadata may include, but is not limited to, the group or customer with which the user and/or endpoint device is associated, the make and model of the endpoint device being used by the user, type and version of application and/or operating system being used by the device associated with the incident alert, downstream provider, and/or network transactional information.

The operational status of the instance associated with the alert may include any information accessible from the instance that indicates how the instance is operating. Such operational status may include, but is not limited to, CPU usage, memory usage, disk usage, network bandwidth usage, non-responsive applications executing on the instance, applications executing on the instance with high CPU usage, applications executing on the instance with high memory usage, and/or applications executing on the instance with high network bandwidth usage. Based upon the disclosure provided herein, one of ordinary skill in the art will recognize a variety of operational status indicators that may be used in relation to different embodiments.

The incident alert is also time stamped with the current time (block 206). A request is provided to a user of the device associated with the incident alert asking for a general explanation of the network element malfunction (block 208). This general explanation is controlled by the user who is provided with various selections and/or prompts to help them think of the relevant information. In addition, the user is given a free form area to write additional information that they think is relevant to the current network element malfunction. The information requested from the user may include, but is not limited to, the approximate time of the first indication of the network element malfunction; and steps taken by the user to mitigate the network element malfunction; and/or steps taken prior to the first indication of the network element malfunction. Based upon the disclosure provided herein, one of ordinary skill in the art will recognize other information that may be requested from the user.

The user is additionally presented with a selection tool by which they are asked to select their belief of what is causing the network element malfunction (block 210). They may select, for example, to characterize whether they perceive the network element malfunction they are reporting is caused by, for example, a hardware malfunction, a software malfunction, and/or a downstream provider failure. Further, the user may be given a free form where the user can use natural language to describe what they think is cause of the network element malfunction. Based upon the disclosure provided herein, one of ordinary skill in the art will recognize a variety of requests for causation that may be made to the user in accordance with different embodiments.

It is determined whether the user has responded to the various requests that have been made and if the metadata surrounding the incident has been received (block 212). Where the information has been received (block 212), a new incident is stored to an incident database where it is cataloged by associating it with zero or more incident tags (block 214). Such incident tags are discrete identification information about the particular incident including, but not limited to, time started, time ended, activity of the user prior to the incident, network transactional information about the incident, and/or user characterization of the incident. Such user characterization of the incident may include, but is not limited to, an indication of user's belief that the problem is a hardware malfunction, software malfunction, and/or downstream provider failure. All of the aforementioned is parsed from the information received from the user and/or the metadata. Based upon the disclosure provided herein, one of ordinary skill in the art will appreciate a variety of other discrete identification information and/or user characterizations that may be included as the incident tags in accordance with different embodiments.

The operational status information gathered as part of the incident report are provided to an automated remediations control processor that checks to see if any of or a combination of the operational status match one or more available automated remediations (block 215). In response, the automated remediations control processor returns one or more automated remediations that match a condition set supported by the operational status.

Concurrently, various prior solutions included in the incident database are scored based upon, for example, a weighted proximity to the current incident to yield a weighted score for each previous solution in the incident database (block 216). The scoring is intended to rank previous solutions based upon which would be most likely to solve the current network element malfunction based upon similarities that the prior solutions had to the instance, instance tags, incident, and incident tags between the prior solution and the current network element malfunction. One example of such a scoring process is described in FIG. 3 below. That said, one of ordinary skill in the art will recognize a variety of approaches for scoring similarities between prior solutions and current network element malfunctions that may be used in relation to different embodiments.

The user is provided with a combination of the highest scored solutions and any automated remediations provided from the automated remediations control processor (block 217). In some embodiments, only active automated remediations are included with the solutions. The user is given an opportunity to try one or more of the proposed solutions to see if they work. As the user attempts one or more of the proposed solutions, they rank the offered solution by whether the solution worked or not and/or provide a new solution that they conceived where none of the proposed solutions worked (block 218). Where the first of the proposed solutions worked they will only vote on that solution. Where, on the other hand, the user attempts multiple solutions they will likely only vote success on one of the solutions and failure on the others. It is determined whether the user has provided the feedback on the success or failure of the solutions provided (block 220).

Once the votes of success or failure and/or new solution are received from the user (block 220), these votes are added to prior votes for the corresponding solutions such that the solutions maintained in the incident database include feedback from one or more users about the value of the given solutions (block 222). Thus, for example, where the user attempted three proposed solutions and one worked, one success vote and two failure votes are received each for a corresponding solution. Alternatively, where the user attempted three proposed solutions and none worked, but found their own solution, three failure votes are received each for a corresponding solution and the new solution is received.

It is determined whether one of the proposed solutions worked (block 224). Where one of the proposed solutions worked (block 224), the solution that worked is linked with the newly created incident and the instance where the problem was detected in the incident database (block 226). Alternatively, where no pre-existing solution worked, but the user identified their own solution that worked (block 224), that new solution is reported by the user and entered in the incident database and linked to the newly created incident and corresponding instance (block 228). This new solution is then considered with the next network element malfunction is reported by another user.

Figure 3:
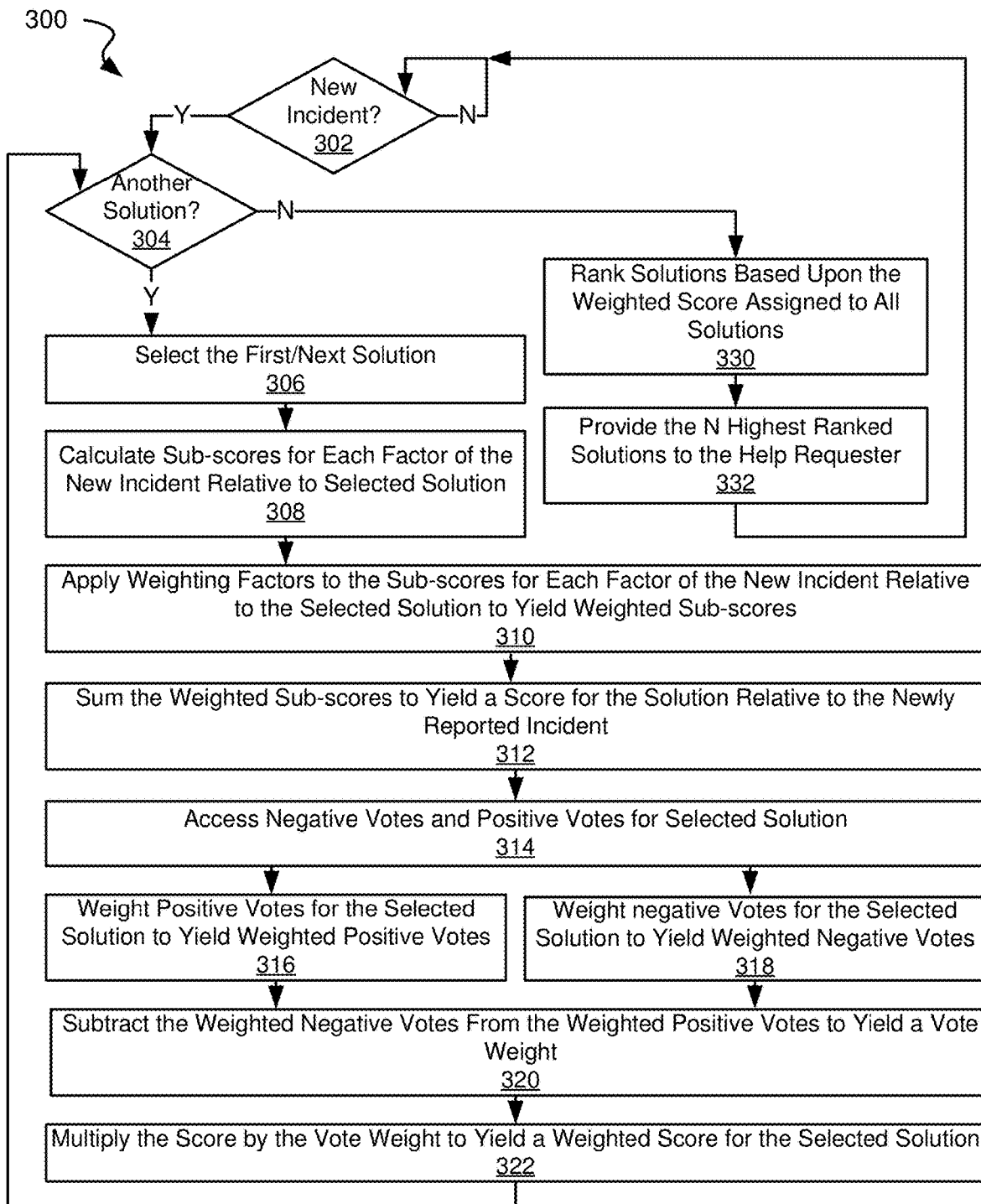
FIG. 3 is a flow diagram showing a method in accordance with some embodiments for ranking solutions for proposal in relation to a received indication of a network element malfunction in accordance with some embodiments.

Turning to FIG. 3, a flow diagram 300 shows a method in accordance with some embodiments for ranking solutions for proposal in relation to a received indication of a network element malfunction. Following flow diagram 300, it is determined if a new network element malfunction has been reported (block 302). Where a network element malfunction has been reported (block 302), it is determined whether it has been compared with every prior solution in an incident database (block 304). Where all solutions have not yet been considered and scored relative to the newly received incident of new network element malfunction (block 304), the first or next solution to be scored is selected from the incident database (block 306).

For the selected solution, a sub-score for each factor relative to the newly reported network element malfunction is calculated (block 308). In one embodiment, the factors and sub-scores are as follow:

(a) If the instance (e.g., endpoint device, server, cloud service, or the like) that is identified with the newly reported network element malfunction is the same as the instance identified with the selected solution then a variable Instance Overlap is set equal to True.

(b) How close (Instance Locality or n) the instance that is identified with the newly reported network element malfunction is to the instance associated with the selected solution. Where, for example, the instance that is identified with the newly reported network element malfunction is from the same customer as the instance associated with the selected solution, then n is set equal to 0. As another example, where the instance that is identified with the newly reported network element malfunction is from the same group but not the same customer as the instance associated with the selected solution, then n is set equal to 1. As another example, where the instance that is identified with the newly reported network element malfunction is from the same super-group but not the same group as the instance associated with the selected solution, then n is set equal to 2. This increase in the value of n continues as the distance between the instance that is identified with the newly reported network element malfunction and that of the selected solution increases.

(c) The fraction (Instance Tag Overlap) of instance tags shared between the instance that is identified with the newly reported network element malfunction and that of the solution is calculated as the number of instance tags of the selected solution divided by the total number of instance tags of the selected solution.

(d) The fraction (Incident Tag Overlap) of incident tags shared between the instance that is identified with the newly reported network element malfunction and that of the solution is calculated as the number of incident tags of the selected solution divided by the total number of incident tags of the selected solution.

(e) If a selected metric is similar between the incident that is identified with the newly reported network element malfunction and that of the solution then a variable Metric Type is set equal to True. Such metrics include, but are not limited to, CPU usage, bandwidth in/out of a server, or whether a given service is running on a machine. Based upon the disclosure provided herein, one of ordinary skill in the art will recognize a variety of metrics that may be collected and included as either instance tags or incident tags in accordance with different embodiments.

(f) Whether the application identified with the newly reported network element malfunction is the same as that of the selected solution then a variable Application Type Overlap is set equal to True.

(g) The inverse of the time proximity (1/t) of the newly reported network element malfunction from the incident associated with the selected solution is calculated.

Weighting factors for each above mentioned sub-scores is applied to yield weighted sub-scores (block 310) and all of the weighted sub-scores are summed to yield a score for the selected solution relative to the reported incident (block 312). The weighting factors applied to the sub-scores is used to vary the relevance of the solution to its corresponding positive votes and negative votes. The weighting factors are as follow: a Time Weighting Factor, an Application Overlap Weighting Factor, a Metric Weighting Factor, a Weighted Incident Tag Factor, a Weighted Instance Tag Factor, and a Location Weighing Factor. These weighting factors are each programmable to allow for tuning the score algorithm. In one particular embodiment, all of the aforementioned weighting factors are one. Using the aforementioned sub-scores for the factors, the score is calculated in accordance with the following pseudocode:

Score Calculation{
  Initialize score to 0;
  If (Instance Overlap == True){
    add a Weighted Instance Overlap Factor to the score;
  }
  multiply a Location Weighing Factor by $\frac{1}{2}^n$ to Yield a Weighted Location;
  add Weighted Location to the score;
  multiply Instance Tag Overlap by an Instance Tag Weighting Factor to -continued Yield Weighted Instance Tag;
  add Weighted Instance Tag Factor to the score;
  multiply Incident Tag Overlap by an Instance Tag Weighting Factor to Yield Weighted Incident Tag;
  add Weighted Incident Tag Factor to the score;
  If(Metric Type Overlap == True){
    add a Metric Weighting Factor to the score;
  }
  If (Application Type Overlap == True){
    add an Application Overlap Weighting Factor to the score;
  }
  multiply Time Proximity by a Time Weighting Factor to Yield a Weighted Proximity;
  add Weighted Proximity to the score;
}

The above mentioned pseudocode can be expressed as:

$$\text{score} = \sum_{factors} w_{factor} \times subscore_{factor}$$

Continuing with flow diagram 300, negative votes and positive votes for the selected solution are accessed from the incident database (block 314). The positive votes are weighted by a positive weighting factor (block 316) and the negative votes are weighted by a negative weighting factor (block 318). These weighting factors are designed to vary the relevance of positive votes to negative votes. The weighted negative votes are subtracted from the weighted positive votes to yield a vote weight (block 320). The previously calculated score is multiplied by the vote weight to yield a weighted score for the selected solution (block 322). In this way each solution is scored by a number of factors to determine similarity with the newly reported network element malfunction, and the weighted by a historical value of the particular solution. The weighted score may be expressed as:

$$\text{score} = \left( \sum_{factors} w_{factor} \times subscore_{factor} \right) \times (w_{pos} \times n_{pos} - w_{neg} \times n_{neg}),$$

Where $n_{pos}$ is the negative weighting factor, $w_{pos}$ is the positive weighting factor, $n_{pos}$ is the number of positive votes for the selected solution, and nneg is the number of negative votes for the solution. This process of scoring solutions continues until all solutions in the incident database have been scored relative to the newly reported network element malfunction.

Once all solutions have been scored relative to the newly reported network element malfunction (i.e., no other solutions remain) (block 304), the solutions are ranked relative to each other based upon the weighted score assigned to each (block 330), and the N highest ranked solutions are provided to the user as possible solutions the newly reported network element malfunction (block 332).

Figure 4:
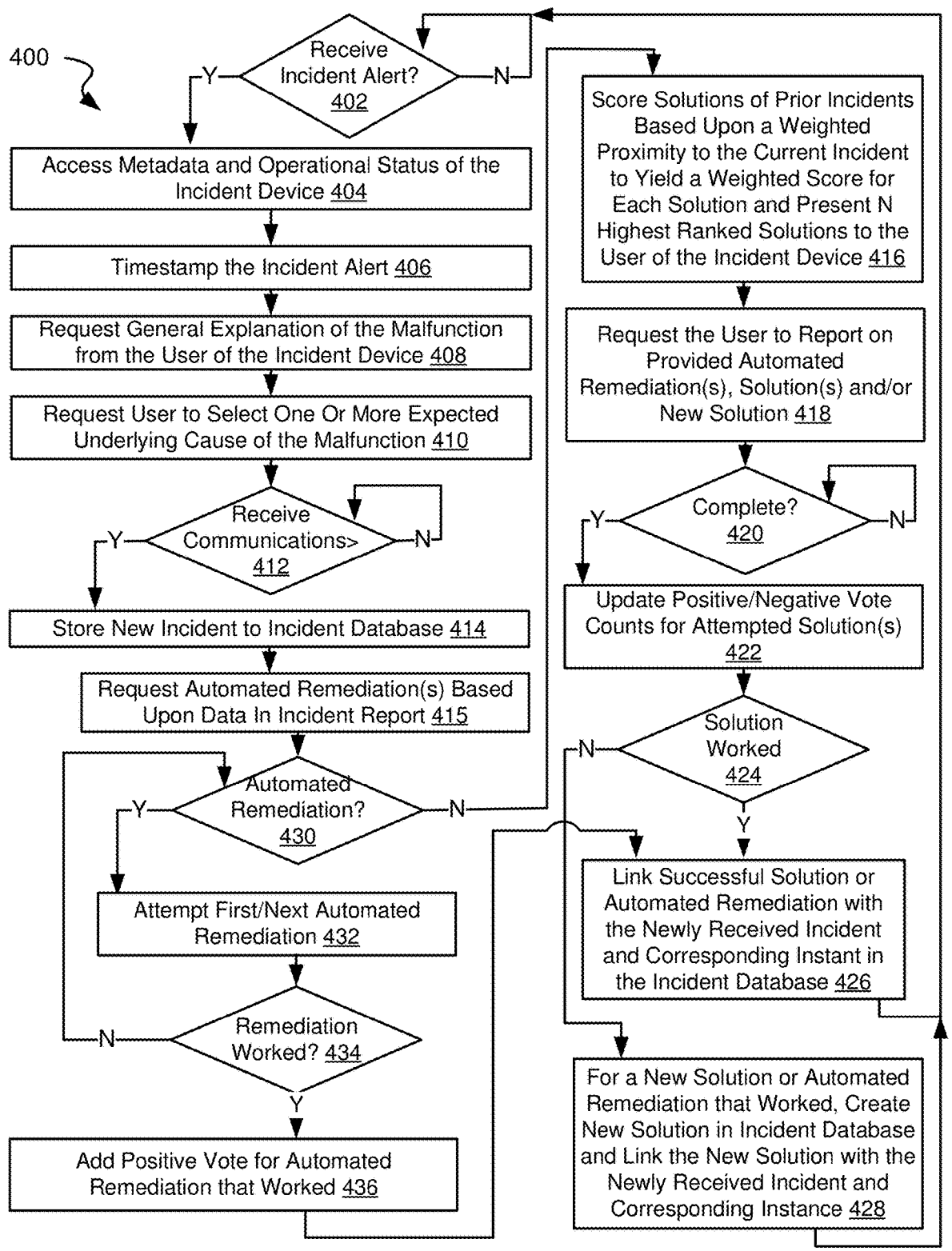
FIG. 4 is a flow diagram showing a method in accordance with other embodiments for cataloging network element malfunctions and incorporating automated remediation into information technology incident solutions.

Turning to FIG. 4, a flow diagram 400 shows a method in accordance with other embodiments for cataloging network element malfunctions and incorporating automated remediation into information technology incident solutions. Following flow diagram 400, it is determined whether an incident alert has been received from either an automated incident monitor or a user (block 402). An incident alert may be an electronic request received, for example, via a web portal where a user is reporting or from any type of communication method where an automated incident monitor is reporting.

Based upon the disclosure provided herein, one of ordinary skill in the art will recognize a variety of mechanisms that may be used by a user or an automated incident monitor to indicate an incident alert and by which an incident alert can be received in accordance with different embodiments.

When an incident alert has been received (block 402), metadata and/or operational status associated with the device, service, and/or software application associated with the incident that corresponds to the incident alert is accessed (block 404). The metadata may be received as part of the incident alert and/or after the incident alert has been received upon solicitation from either the user or automated incident monitor that reported the incident alert. In some cases, this metadata includes information about the instance associated with the incident alert and/or about the network element malfunction or incident being reported. Such metadata may include, but is not limited to, the group or customer with which the user and/or endpoint device is associated, the make and model of the endpoint device being used by the user, type and version of application and/or operating system being used by the device associated with the incident alert, downstream provider, and/or network transactional information.

The operational status of the instance associated with the alert may include any information accessible from the instance that indicates how the instance is operating. Such operational status may include, but is not limited to, CPU usage, memory usage, disk usage, network bandwidth usage, non-responsive applications executing on the instance, applications executing on the instance with high CPU usage, applications executing on the instance with high memory usage, and/or applications executing on the instance with high network bandwidth usage. Based upon the disclosure provided herein, one of ordinary skill in the art will recognize a variety of operational status indicators that may be used in relation to different embodiments.

The incident alert is also time stamped with the current time (block 406). A request is provided to a user of the device associated with the incident alert asking for a general explanation of the network element malfunction (block 408). This general explanation is controlled by the user who is provided with various selections and/or prompts to help them think of the relevant information. In addition, the user is given a free form area to write additional information that they think is relevant to the current network element malfunction. The information requested from the user may include, but is not limited to, the approximate time of the first indication of the network element malfunction; and steps taken by the user to mitigate the network element malfunction; and/or steps taken prior to the first indication of the network element malfunction. Based upon the disclosure provided herein, one of ordinary skill in the art will recognize other information that may be requested from the user.

The user is additionally presented with a selection tool by which they are asked to select their belief of what is causing the network element malfunction (block 410). They may select, for example, to characterize whether they perceive the network element malfunction they are reporting is caused by, for example, a hardware malfunction, a software malfunction, and/or a downstream provider failure. Further, the user may be given a free form where the user can use natural language to describe what they think is cause of the network element malfunction. Based upon the disclosure provided herein, one of ordinary skill in the art will recognize a variety of requests for causation that may be made to the user in accordance with different embodiments.

It is determined whether the user has responded to the various requests that have been made and if the metadata surrounding the incident has been received (block 412). Where the information has been received (block 412), a new incident is stored to an incident database where it is cataloged by associating it with zero or more incident tags (block 414). Such incident tags are discrete identification information about the particular incident including, but not limited to, time started, time ended, activity of the user prior to the incident, network transactional information about the incident, and/or user characterization of the incident. Such user characterization of the incident may include, but is not limited to, an indication of user's belief that the problem is a hardware malfunction, software malfunction, and/or downstream provider failure. All of the aforementioned is parsed from the information received from the user and/or the metadata. Based upon the disclosure provided herein, one of ordinary skill in the art will appreciate a variety of other discrete identification information and/or user characterizations that may be included as the incident tags in accordance with different embodiments.

The operational status information gathered as part of the incident report are provided to an automated remediations control processor that checks to see if any of or a combination of the operational status (i.e., condition sets) match one or more available automated remediations (block 415). In response, the automated remediations control processor returns one or more automated remediations if any match a condition set supported by the operational status. As in this case the automated remediations may be automatically applied without further input from a user, in some embodiments only active automated remediations that are minimally invasive are eligible for selection. Such minimally invasive active automated mediations may include, for example, automated remediations that make changes to network devices that do not impact user data. In contrast, an active automated remediation that restarts a network device may not be eligible for selection. Based upon the disclosure provided herein, one of ordinary skill in the art will recognize a variety of automated remediations that would be appropriate for selection depending upon the particular embodiment and/or deployment environment.

It is determined whether one or more automated remediations remain to be executed (block 430). Where one remains to be executed (block 430), the particular automated remediation is attempted (block 432). This includes automatically performing the one or more processes included as part of the automated remediation. It is determined whether the automated remediation worked (block 434). This may be determined automatically by monitoring a change in the operational status, or may be determined by querying the user as to whether the automated remediation worked. Where the automated remediation did not work (block 434), the processes of blocks 430-434 are repeated for another automated remedation (if any remain). Where the automated remediation worked (block 434), a positive vote is added for the automated remediation prior to adding it to the incident database as a possible solution for the logged incident (block 436). The automated remediation that worked is linked with the newly created incident and the instance where the problem was detected in the incident database, and the automated remediation is added as a solution (block 426).

Where, on the other hand, no automated remediations were provided or remain for processing (block 430), various prior solutions included in the incident database are scored based upon, for example, a weighted proximity to the current incident to yield a weighted score for each previous solution in the incident database (block 416). The scoring is intended to rank previous solutions based upon which would be most likely to solve the current network element malfunction based upon similarities that the prior solutions had to the instance, instance tags, incident, and incident tags between the prior solution and the current network element malfunction. One example of such a scoring process is described in FIG. 3 above. That said, one of ordinary skill in the art will recognize a variety of approaches for scoring similarities between prior solutions and current network element malfunctions that may be used in relation to different embodiments.

The user is given an opportunity to try one or more of the proposed solutions to see if they work. As the user attempts one or more of the proposed solutions, they rank the offered solution by whether the solution worked or not and/or provide a new solution that they conceived where none of the proposed solutions worked (block 418). Where the first of the proposed solutions worked they will only vote on that solution. Where, on the other hand, the user attempts multiple solutions they will likely only vote success on one of the solutions and failure on the others. It is determined whether the user has provided the feedback on the success or failure of the solutions provided (block 420).

Once the votes of success or failure and/or new solution are received from the user (block 420), these votes are added to prior votes for the corresponding solutions such that the solutions maintained in the incident database include feedback from one or more users about the value of the given solutions (block 422). Thus, for example, where the user attempted three proposed solutions and one worked, one success vote and two failure votes are received each for a corresponding solution. Alternatively, where the user attempted three proposed solutions and none worked, but found their own solution, three failure votes are received each for a corresponding solution and the new solution is received.

It is determined whether one of the proposed solutions worked (block 424). Where one of the proposed solutions worked (block 424), the solution that worked is linked with the newly created incident and the instance where the problem was detected in the incident database (block 426). Alternatively, where no pre-existing solution worked, but the user identified their own solution that worked (block 424), that new solution is reported by the user and entered in the incident database and linked to the newly created incident and corresponding instance (block 428). This new solution is then considered with the next network element malfunction is reported by another user.

Figure 5:
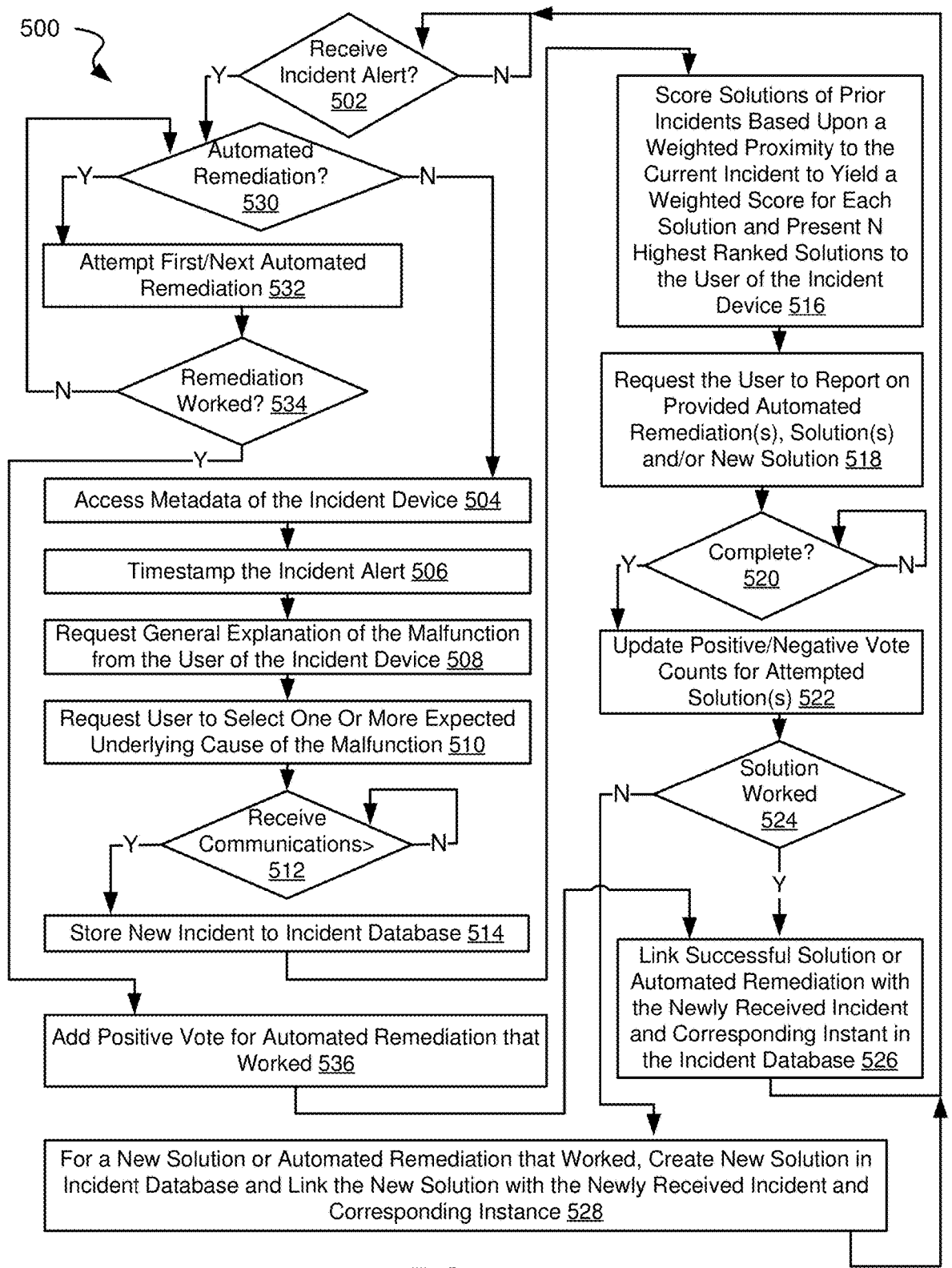
FIG. 5 is a flow diagram showing a method in accordance with yet other embodiments for cataloging network element malfunctions and incorporating automated remediation into information technology incident solutions.

Turning to FIG. 5, a flow diagram 500 shows a method in accordance with yet other embodiments for cataloging network element malfunctions and incorporating automated remediation into information technology incident solutions. Following flow diagram 500, it is determined whether an incident alert has been received from either an automated incident monitor or a user (block 502). An incident alert may be an electronic request received, for example, via a web portal where a user is reporting or from any type of communication method where an automated incident monitor is reporting. Based upon the disclosure provided herein, one of ordinary skill in the art will recognize a variety of mechanisms that may be used by a user or an automated incident monitor to indicate an incident alert and by which an incident alert can be received in accordance with different embodiments.

When an incident alert has been received (block 502), an automated remediations control processor is accessed to determine whether there are any available automated remediations that match a condition set presented by a network device associated with the incident alert. The automated remediations control processor may access one or more network devices associated with the incident alert to determine if a condition set exists for automated remediation.

It is determined whether one or more automated remediations remain to be executed (block 530). Where one remains to be executed (block 530), the particular automated remediation is attempted (block 532). This includes automatically performing the one or more processes included as part of the automated remediation. It is determined whether the automated remediation worked (block 534). This may be determined automatically by monitoring a change in the operational status, or may be determined by querying the user as to whether the automated remediation worked. Where the automated remediation did not work (block 534), the processes of blocks 530-534 are repeated for another automated remedation (if any). Where the automated remediation worked (block 534), a positive vote is added for the automated remediation prior to adding it to the incident database as a possible solution for the logged incident (block 536). The automated remediation that worked is linked with the newly created incident and the instance where the problem was detected in the incident database, and the automated remediation is added as a solution (block 526) and the incident alert is closed and the process returns to await the next incident alert (block 502).

Where, on the other hand, no automated remediations were provided or remain for processing (block 530), metadata associated with the device, service, and/or software application associated with the incident that corresponds to the incident alert is accessed (block 504). The metadata may be received as part of the incident alert and/or after the incident alert has been received upon solicitation from either the user or automated incident monitor that reported the incident alert. In some cases, this metadata includes information about the instance associated with the incident alert and/or about the network element malfunction or incident being reported. Such metadata may include, but is not limited to, the group or customer with which the user and/or endpoint device is associated, the make and model of the endpoint device being used by the user, type and version of application and/or operating system being used by the device associated with the incident alert, downstream provider, and/or network transactional information. The incident alert is also time stamped with the current time (block 506).

A request is provided to a user of the device associated with the incident alert asking for a general explanation of the network element malfunction (block 508). This general explanation is controlled by the user who is provided with various selections and/or prompts to help them think of the relevant information. In addition, the user is given a free form area to write additional information that they think is relevant to the current network element malfunction. The information requested from the user may include, but is not limited to, the approximate time of the first indication of the network element malfunction; and steps taken by the user to mitigate the network element malfunction; and/or steps taken prior to the first indication of the network element malfunction. Based upon the disclosure provided herein, one of ordinary skill in the art will recognize other information that may be requested from the user.

The user is additionally presented with a selection tool by which they are asked to select their belief of what is causing the network element malfunction (block 510). They may select, for example, to characterize whether they perceive the network element malfunction they are reporting is caused by, for example, a hardware malfunction, a software malfunction, and/or a downstream provider failure. Further, the user may be given a free form where the user can use natural language to describe what they think is cause of the network element malfunction. Based upon the disclosure provided herein, one of ordinary skill in the art will recognize a variety of requests for causation that may be made to the user in accordance with different embodiments.

It is determined whether the user has responded to the various requests that have been made and if the metadata surrounding the incident has been received (block 512). Where the information has been received (block 512), a new incident is stored to an incident database where it is cataloged by associating it with zero or more incident tags (block 514). Such incident tags are discrete identification information about the particular incident including, but not limited to, time started, time ended, activity of the user prior to the incident, network transactional information about the incident, and/or user characterization of the incident. Such user characterization of the incident may include, but is not limited to, an indication of user's belief that the problem is a hardware malfunction, software malfunction, and/or downstream provider failure. All of the aforementioned is parsed from the information received from the user and/or the metadata. Based upon the disclosure provided herein, one of ordinary skill in the art will appreciate a variety of other discrete identification information and/or user characterizations that may be included as the incident tags in accordance with different embodiments.

Various prior solutions included in the incident database are scored based upon, for example, a weighted proximity to the current incident to yield a weighted score for each previous solution in the incident database (block 516). The scoring is intended to rank previous solutions based upon which would be most likely to solve the current network element malfunction based upon similarities that the prior solutions had to the instance, instance tags, incident, and incident tags between the prior solution and the current network element malfunction. One example of such a scoring process is described in FIG. 3 above. That said, one of ordinary skill in the art will recognize a variety of approaches for scoring similarities between prior solutions and current network element malfunctions that may be used in relation to different embodiments.

The user is given an opportunity to try one or more of the proposed solutions to see if they work. As the user attempts one or more of the proposed solutions, they rank the offered solution by whether the solution worked or not and/or provide a new solution that they conceived where none of the proposed solutions worked (block 518). Where the first of the proposed solutions worked they will only vote on that solution. Where, on the other hand, the user attempts multiple solutions they will likely only vote success on one of the solutions and failure on the others. It is determined whether the user has provided the feedback on the success or failure of the solutions provided (block 520).

Once the votes of success or failure and/or new solution are received from the user (block 520), these votes are added to prior votes for the corresponding solutions such that the solutions maintained in the incident database include feedback from one or more users about the value of the given solutions (block 522). Thus, for example, where the user attempted three proposed solutions and one worked, one success vote and two failure votes are received each for a corresponding solution. Alternatively, where the user attempted three proposed solutions and none worked, but found their own solution, three failure votes are received each for a corresponding solution and the new solution is received.

It is determined whether one of the proposed solutions worked (block 524). Where one of the proposed solutions worked (block 524), the solution that worked is linked with the newly created incident and the instance where the problem was detected in the incident database (block 526). Alternatively, where no pre-existing solution worked, but the user identified their own solution that worked (block 524), that new solution is reported by the user and entered in the incident database and linked to the newly created incident and corresponding instance (block 528). This new solution is then considered with the next network element malfunction is reported by another user.

Figure 6:
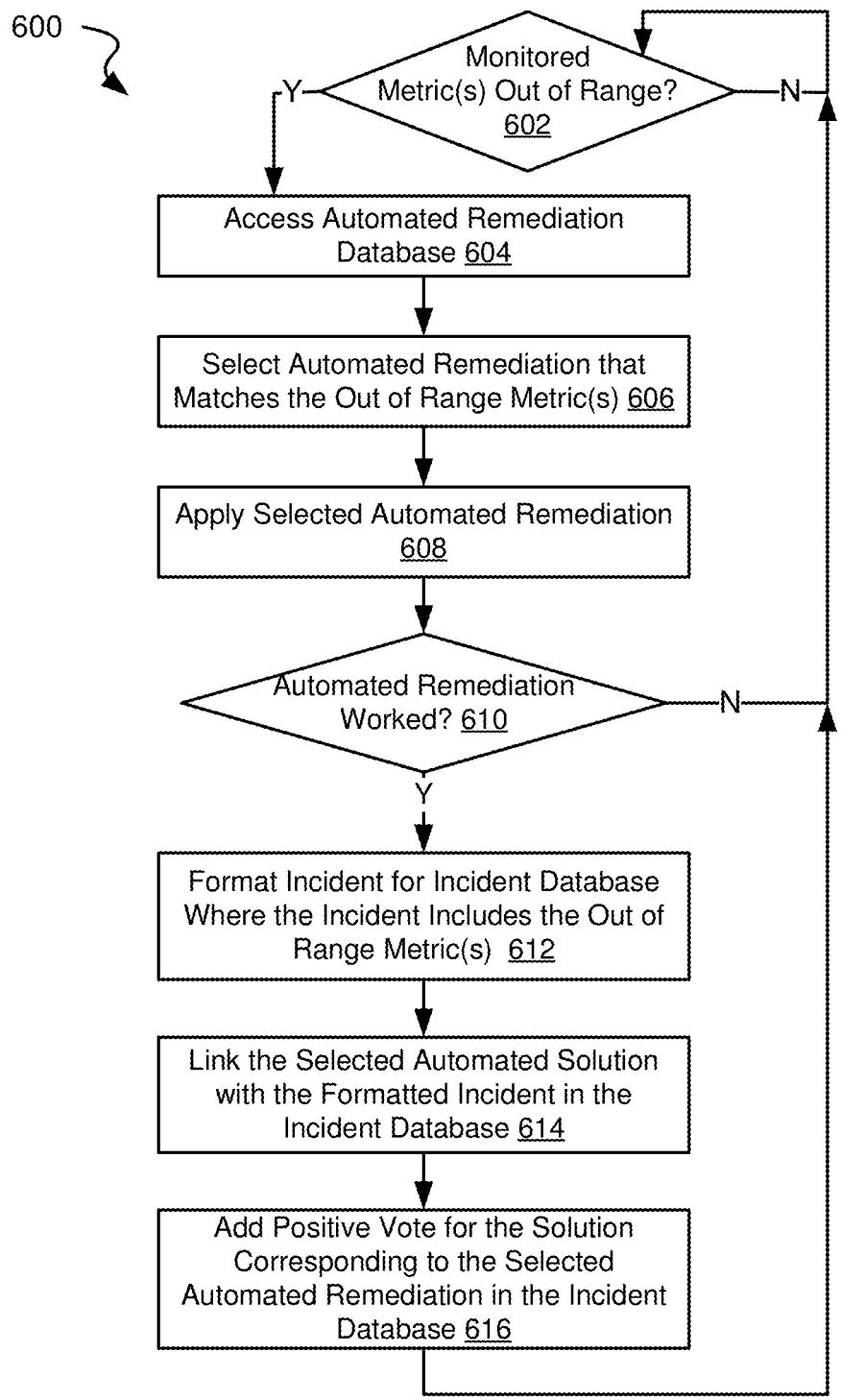
FIG. 6 is a flow diagram showing a method in accordance with yet other embodiments for migrating previously programmed automated remediations to a database of incident solutions.

Turning to FIG. 6, a flow diagram 600 shows a method in accordance with yet other embodiments for migrating previously programmed automated remediations to a database of incident solutions. Following flow diagram 600, a number of metrics are monitored to determine if they are out of range and thereby meet a condition set for applying an automated remediation (block 602). Where the monitored metrics meet a condition set for an automated remediation (block 602), an automated remediation database is accessed (block 604) and an automated remediation is selected from the automated remediation database that matches the out of range metrics (block 606). The selected automated remediation is applied (block 608), and it is determined whether the selected automated remediation worked (block 610). This may be determined automatically by monitoring a change in the operational status, or may be determined by querying a user as to whether the automated remediation worked. Where the automated remediation worked (block 610), an incident is formatted for the automated database that includes the out of range metrics as an indicator of the incident (block 612). The selected automated solution that worked is linked with the formatted incident as a possible solution in the incident database (block 614). A positive vote is added for the solution corresponding to the automated remediation in the incident database (block 616). As such, an automated solution programmed by one user to be applied for a programmed condition set is made available for other users to select out of the incident database using one or more of the approaches discussed above in relation to FIG. 2, 4, or 5.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for distributing network intelligence, the method comprising:
   receiving, by a processing resource, an indication of a network element malfunction, wherein the indication of the network element malfunction includes at least a first data, and wherein the first data is selected from a group consisting of: a location of an instance reporting the network element malfunction; and an identity of an application associated with the network element malfunction;
   identifying, by the processing resource, an automated remediation corresponding to the first data, wherein identifying the automated remediation includes:

calculating, by the processing resource, a first weighted value of a first solution in an automated remediation database based at least in part on the first data, wherein calculating the first weighted value includes generating at least three values using at least three of the following processes:
  (a) setting an application type overlap flag equal to true when the identity of the application associated with the network element malfunction is the same as an identity of an application included in the first solution;
  (b) setting an instance overlap flag equal to true when an identity of the instance reporting the network element malfunction is the same as an identity of an instance included in the first solution;
  (c) determining a proximity of the location of the instance reporting the network element malfunction to a location of an instance indicated in the first solution;
  (d) determining a fraction of incident tags of the network element malfunction that are the same as incident tags of the first solution;
  (e) determining a fraction of instance tags of the network element malfunction that are the same as instance tags of the first solution; and
  (f) determining an inverse of the time proximity between a time of the network element malfunction and a time of the first solution;
calculating, by the processing resource, a second weighted value of a second solution in the automated remediation database based at least in part on the first data; and
selecting, by the processing resource, one of the first solution or the second solution as the automated remediation based at least in part on the first weighted value and the second weighted value;
applying, by the processing resource, the automated remediation; and
linking, by the processing resource, the automated remediation as a possible solution for an incident in an incident database, wherein the incident database is separate from the automated remediation database.

2. The method of claim 1, the method further comprising:
creating, by the processing resource, the incident in the incident database based at least in part upon a determination that the network element malfunction was changed by application of the automated remediation, and wherein the incident is associated with at least the first data.

3. The method of claim 1, the method further comprising:
creating, by the processing resource, the incident in the incident database based at least in part upon a determination that the network element malfunction was cured by application of the automated remediation, and wherein the incident is associated with at least the first data.

4. The method of claim 1, the method further comprising:
adding a positive vote for the possible solution based at least in part upon a determination that the network element malfunction was cured by application of the automated remediation.

5. The method of claim 1, wherein the automated remediation is pre-programmed by a first user to be applied when at least the first data is detected, and wherein the indication of the network element malfunction is received from a second user.

6. The method of claim 1, the method further comprising:
providing the automated remediation as one of a number of possible solutions to the network element malfunction;
receiving a solution selection indicating the automated remediation; and
wherein the applying the automated remediation is done based at least in part on the solution selection.

7. The method of claim 1, wherein the incident database includes at least one non-automated solution linked to the incident.

8. The method of claim 1, wherein:
calculating the first weighted value of the first solution is based at least in part on a combination of the first data and one or more votes indicating a utility of the first solution in addressing at least a first prior network element malfunction; and
calculating the second weighted value of the second solution is based at least in part on a combination of the first data and one or more votes indicating a utility of the second solution in addressing at least a second prior network element malfunction.

9. The method of claim 1, wherein the first data is the location of the instance reporting the network element malfunction, and wherein calculating the first weighted value of the first solution in the automated remediation database based at least in part on the first data includes determining a proximity of the location of the instance reporting the network element malfunction to a location of an instance indicated in the first solution.

10. The method of claim 1, wherein the first data is the identity of the application associated with the network element malfunction, and wherein calculating the first weighted value of the first solution in the automated remediation database based at least in part on the first data includes setting an application type overlap flag equal to true when the identity of the application associated with the network element malfunction is the same as an identity of an application included in the first solution.

11. The method of claim 1, wherein calculating the first weighted value of the first solution in the automated remediation database based at least in part on the first data further includes:
weighting each of the at least three values to yield respective weighted values; and
summing the respective weighted values to yield the first weighted value.

12. The method of claim 11, wherein weighting each of the at least three values to yield respective weighted values includes multiplying each of the at least three values by a respective weighing factor specific to each of the at least three values.

13. A method for distributing network intelligence, the method comprising:
receiving, by a processing resource, an indication of a network element malfunction, wherein the indication of the network element malfunction includes at least a first data, and wherein the first data is selected from a group consisting of: a location of an instance reporting the network element malfunction; and an identity of an application associated with the network element malfunction;
identifying, by the processing resource, an automated remediation corresponding to the first data, wherein identifying the automated remediation includes:
  calculating, by the processing resource, a first weighted value of a first solution in an automated remediation database based at least in part on the first data, wherein calculating the first weighted value includes generating at least three values using at least three of the following processes:
(a) setting an application type overlap flag equal to true when the identity of the application associated with the network element malfunction is the same as an identity of an application included in the first solution;
(b) setting an instance overlap flag equal to true an identity of the instance reporting the network element malfunction is the same as an identity of an instance included in the first solution;
(c) determining a proximity of the location of the instance reporting the network element malfunction to a location of an instance indicated in the first solution;
(d) determining a fraction of incident tags of the network element malfunction that are the same as incident tags of the first solution;
(e) determining a fraction of instance tags of the network element malfunction that are the same as instance tags of the first solution; and
(f) determining an inverse of the time proximity between a time of the network element malfunction and a time of the first solution;
calculating, by the processing resource, a second weighted value of a second solution in the automated remediation database based at least in part on the first data; and
identifying, by the processing resource, one of the first solution or the second solution as the automated remediation based at least in part on the first weighted value and the second weighted value;
applying, by the processing resource, the automated remediation; and
linking, by the processing resource, the automated remediation as a possible solution for an incident in an incident database based at least in part upon a determination that the network element malfunction was changed by application of the automated remediation.

14. The method of claim 13, wherein the determination that the network element malfunction was changed by application of the automated remediation is a determination that the network element malfunction was cured by application of the automated remediation.

15. The method of claim 13, the method further comprising: adding a positive vote for the possible solution based at least in part upon the determination that the network element malfunction was changed by application of the automated remediation.

16. The method of claim 13, wherein the automated remediation is pre-programmed by a first user to be applied when at least the first data is detected, wherein the automated remediation is maintained in an automated remediation database that is separate from the incident database, and wherein the indication of the network element malfunction is received from a second user.

17. The method of claim 13, the method further comprising:
providing the automated remediation as one of a number of possible solutions to the network element malfunction;
receiving a solution selection indicating the automated remediation; and
wherein the applying the automated remediation is done based at least in part on the solution selection.

18. The method of claim 13, the method further comprising: creating, by the processing resource, the incident in the incident database that includes at least the first data.

19. The method of claim 13, wherein the incident database includes at least one non-automated solution linked to the incident.

20. A network incident system, the network incident system comprising:
a processing resource;
an incident database, wherein the incident database includes: at least a first incident corresponding to a prior network element malfunction, at least a first possible solution linked to the first incident, and at least a first incident tag linked to the first incident wherein the first incident tag includes at least a first element describing an aspect of the prior network element malfunction; and
a memory, wherein the memory includes instructions executable by the processing resource to:
receive an indication of a current network element malfunction, wherein the indication of the current network element malfunction includes at least a first data describing an aspect of the current network element malfunction, and wherein the first data is selected from a group consisting of: a location of an instance reporting the network element malfunction; and an identity of an application associated with the network element malfunction;
identify an automated remediation corresponding to the first data, wherein identifying the automated remediation includes:
calculating a first weighted value of a first solution in an automated remediation database based at least in part on the first data, wherein calculating the first weighted value includes generating at least three values using at least three of the following processes:
(a) setting an application type overlap flag equal to true when the identity of the application associated with the network element malfunction is the same as an identity of an application included in the first solution;
(b) setting an instance overlap flag equal to true an identity of the instance reporting the network element malfunction is the same as an identity of an instance included in the first solution;
(c) determining a proximity of the location of the instance reporting the network element malfunction to a location of an instance indicated in the first solution;
(d) determining a fraction of incident tags of the network element malfunction that are the same as incident tags of the first solution;
(e) determining a fraction of instance tags of the network element malfunction that are the same as instance tags of the first solution; and
(f) determining an inverse of the time proximity between a time of the network element malfunction and a time of the first solution;
calculating a second weighted value of a second solution in the automated remediation database based at least in part on the first data; and
selecting one of the first solution or the second solution as the automated remediation based at least in part on the first weighted value and the second weighted value;
apply the automated remediation; and link the automated remediation as a solution to an incident in the incident database based at least in part upon a determination that the network element malfunction was changed by application of the automated remediation.

21. The method of claim 20, wherein the incident in the incident database to which the solution is linked is the first incident in the incident database, and wherein the solution is a second possible solution linked to the first incident.

22. The method of claim 21, wherein the first possible solution is linked to the first incident in the incident database is a non-automated solution.

23. The method of claim 20, wherein the memory includes further instructions executable by the processing resource to:
add a positive vote for the solution based at least in part upon the determination that the network element malfunction was changed by application of the automated remediation.

24. The method of claim 20, wherein the automated remediation is pre-programmed by a first user to be applied when at least the first data is detected, wherein the automated remediation is maintained in an automated remediation database that is separate from the incident database, and wherein the indication of the network element malfunction is received from a second user.

25. The method of claim 20, wherein the memory includes further instructions executable by the processing resource to:
provide the automated remediation as one of a number of possible solutions to the network element malfunction;
receive a solution selection indicating the automated remediation; and
wherein instructions to apply the automated remediation only apply the automated remediation upon receiving the solution selection.

26. The method of claim 20, wherein the memory includes further instructions executable by the processing resource to:
create a second incident in the incident database, wherein the second incident is linked to the solution and a second incident tag, wherein the second incident tag includes at least the first data as a second element describing an aspect of the current network element malfunction.

27. A non-transitory computer-readable storage medium embodying a set of instructions, which when executed by a processing resource, causes the processing resource to perform a method comprising:
receiving an indication of a network element malfunction, wherein the indication of the network element malfunction includes at least a first data;
identify an automated remediation corresponding to the first data, wherein identifying the automated remediation includes:
calculating a first weighted value of a first solution in an automated remediation database based at least in part on the first data;
calculating a second weighted value of a second solution in the automated remediation database based at least in part on the first data; and
selecting one of the first solution or the second solution as the automated remediation based at least in part on the first weighted value and the second weighted value;
applying the automated remediation;
linking the automated remediation as a possible solution for an incident in an incident database based at least in part upon a determination that the network element malfunction was changed by application of the automated remediation;
adding to a positive vote count for the possible solution based at least in part upon a determination that the network element malfunction was improved by application of the automated remediation;
adding to a negative vote count for the possible solution based at least in part upon a determination that the network element malfunction was not improved by application of the automated remediation; and
wherein calculating the first weighted value of the first solution in the automated remediation database to the network element malfunction includes:
calculating, by the processing resource, a first sub-score corresponding to a first factor of the first data;
applying, by the processing resource, a first weighting factor to the first sub-score to yield a first weighted sub-score;
calculating, by the processing resource, a second sub-score corresponding to a second factor of the first data;
applying, by the processing resource, a second weighting factor to the second sub-score to yield a second weighted sub-score; and
summing, by the processing resource, at least the first weighted sub-score and the second weighted sub-score to yield a first interim value;
applying, by the processing resource, a first weighting factor to the positive vote count to yield a first weighted vote count;
applying, by the processing resource, a second weighting factor to the negative vote count to yield a second weighted vote count; and
subtracting, by the processing resource, the second weighted vote count from the first weighted vote count to yield a second interim value; and
multiplying, by the processing resource, the first interim value by the second interim value to yield the first weighted value.

28. The method of claim 27, wherein at least one of the first weighting factor or the second weighting factor is not equal to unity.

* * * * *